(12) United States Patent
Kao et al.

(10) Patent No.: US 10,884,558 B2
(45) Date of Patent: Jan. 5, 2021

(54) SENSOR DESIGN FOR NFC-INTEGRATED TOUCHPAD

(71) Applicant: Synaptics Incorporated, San Jose, CA (US)

(72) Inventors: Tzeng-Fu Kao, Taipei (TW); Christopher Chongbin Rehn, Taipei (TW)

(73) Assignee: Synaptics Incorporated, San Jose, CA (US)

( * ) Notice: Subject to any disclaimer, the term of this patent is extended or adjusted under 35 U.S.C. 154(b) by 39 days.

(21) Appl. No.: 16/258,992

(22) Filed: Jan. 28, 2019

(65) Prior Publication Data
US 2020/0241663 A1 Jul. 30, 2020

(51) Int. Cl.
*G06F 3/041* (2006.01)
*G06F 3/044* (2006.01)
*H04B 5/00* (2006.01)
*H01Q 1/22* (2006.01)
*H04B 5/02* (2006.01)

(52) U.S. Cl.
CPC ........... *G06F 3/044* (2013.01); *H01Q 1/2266* (2013.01); *H04B 5/0031* (2013.01); *H04B 5/02* (2013.01); *G06F 2203/04108* (2013.01)

(58) Field of Classification Search
CPC ......... G06F 3/041; G06F 3/044; H03K 17/96; H01B 13/00
See application file for complete search history.

(56) References Cited

U.S. PATENT DOCUMENTS

| | | | |
|---|---|---|---|
| 2006/0152334 A1* | 7/2006 | Maercklein | H05K 1/0259 338/210 |
| 2014/0176371 A1* | 6/2014 | Liao | G06F 1/1643 343/702 |
| 2014/0253830 A1* | 9/2014 | Li | G06F 3/044 349/12 |
| 2017/0040089 A1* | 2/2017 | Lee | H01L 31/18 |

* cited by examiner

*Primary Examiner* — Michael A Faragalla
(74) *Attorney, Agent, or Firm* — Paradice & Li LLP (57) ABSTRACT

An input device includes a plurality of sensor electrodes, an antenna, and a shield trace disposed between at least some of the sensor electrodes and the antenna. The antenna may be coupled to a transceiver and may transmit and receive radio-frequency (RF) communication signals. The shield trace may reduce, at least in part, coupling of the RF communication signals from the antenna to the sensor electrodes. The plurality of sensor electrodes may determine a presence, and/or a motion associated with an input object.

20 Claims, 5 Drawing Sheets

SENSOR DESIGN FOR NFC-INTEGRATED TOUCHPAD

TECHNICAL FIELD

This disclosure relates generally to sensing touchpads, and more specifically to sensing touchpads integrated with near-field communication (NFC) antennas.

BACKGROUND OF RELATED ART

Input devices including proximity sensor devices (also commonly referred to as touchpads or touch sensor devices) are widely used in a variety of electronic systems. A proximity sensor device typically includes a sensing region, often demarked by a surface, in which the proximity sensor device determines the presence, location, and/or motion of one or more input objects. Proximity sensor devices may provide an input interface for an electronic system. For example, proximity sensor devices may be used as input devices for larger electronic systems (such as opaque touchpads integrated in, or peripheral to, notebook or desktop computers). Proximity sensor devices may also be used in smaller electronics systems (such as touch screens integrated in cellular phones).

An active (e.g., powered) near field communication (NFC) transceiver may be collocated with the electronic system. NFC transceivers use radio frequency (RF) communication signals for short range communication between compatible NFC devices. In some cases, transmitted NFC signals may be used to supply power to other NFC devices. The NFC signals, however, may interfere with the operation of the collocated electronic systems.

Thus, there exists a need for a proximity sensor that can detect input objects and withstand interference from RF communication signals.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

An input device with an integrated antenna is disclosed. The input device includes an input surface having a sensing region, a plurality of sensor electrodes disposed beneath the input surface and configured to detect an input object in the sensing region, wherein the plurality of sensor electrodes include at least a first electrode and a second electrode, an antenna disposed beneath the input surface and the plurality of sensor electrodes, the antenna being configured to transmit and receive radio-frequency (RF) communication signals, and a shield trace disposed between the plurality of sensor electrodes and the antenna, wherein the shield trace encompasses a region in which the first electrode overlaps the antenna and is absent from a region in which the second electrode overlaps the antenna.

An electronic system is disclosed. The electronic system includes a transceiver configured to transmit and receive radio-frequency (RF) communication signals, and an input device. The input device includes an input surface having a sensing region, a plurality of sensor electrodes disposed beneath the input surface and configured to detect an input object in the sensing region, wherein the plurality of sensor electrodes include at least a first electrode and a second electrode, an antenna disposed beneath the input surface and the plurality of sensor electrodes, the antenna being configured to transmit RF communication signals from the transceiver; and a shield trace disposed between the plurality of sensor electrodes and the antenna, wherein the shield trace encompasses a region in which the first electrode overlaps the antenna and is absent from a region in which the second electrode overlaps the antenna.

BRIEF DESCRIPTION OF THE DRAWINGS

The present embodiments are illustrated by way of example and are not intended to be limited by the figures of the accompanying drawings.

DETAILED DESCRIPTION

In the following description, numerous specific details are set forth such as examples of specific components, circuits, and processes to provide a thorough understanding of the present disclosure. The term "coupled" as used herein means connected directly to or connected through one or more intervening components or circuits. The terms "electronic system" and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example implementations. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the implementations disclosed herein may be executed by one or more processors. The term "processor," as used herein may refer to any general purpose processor, conventional processor, controller, microcontroller, and/or state machine capable of executing scripts or instructions of one or more software programs stored in memory. The term "voltage source," as used herein may refer to a direct-current (DC) voltage source, an alternating-current (AC) voltage source, or any other means of creating an electrical potential (such as ground).

Integrating an antenna together with an input device (e.g., a touchpad), may add radio-frequency (RF) communication functionality without increasing the size or footprint of the devices by a significant amount. The antenna, however, may contribute interference and negatively affect operations of the input device. Furthermore, components associated with the input device may also hinder RF communications using the antenna.

In some implementations, the input device may include a plurality of sensor electrodes configured to detect changes in capacitance and thereby determine a location and/or position of an input object. An antenna may be disposed adjacent to and/or beneath the plurality of sensor electrodes to transmit and receive radio-frequency (RF) communication signals. A shield trace may be disposed between at least some of the plurality of sensor electrodes and the antenna to reduce RF interference from the antenna that may affect operation of the sensor electrodes. In some aspects, design of the input device may be guided by a target open area ratio describing the amount of open area (e.g., area devoid of traces and components) above the antenna. The target open area ratio may enable propagation of RF communication signals while providing sufficient area for sensor electrodes to detect changes in capacitance.

Figure 1:
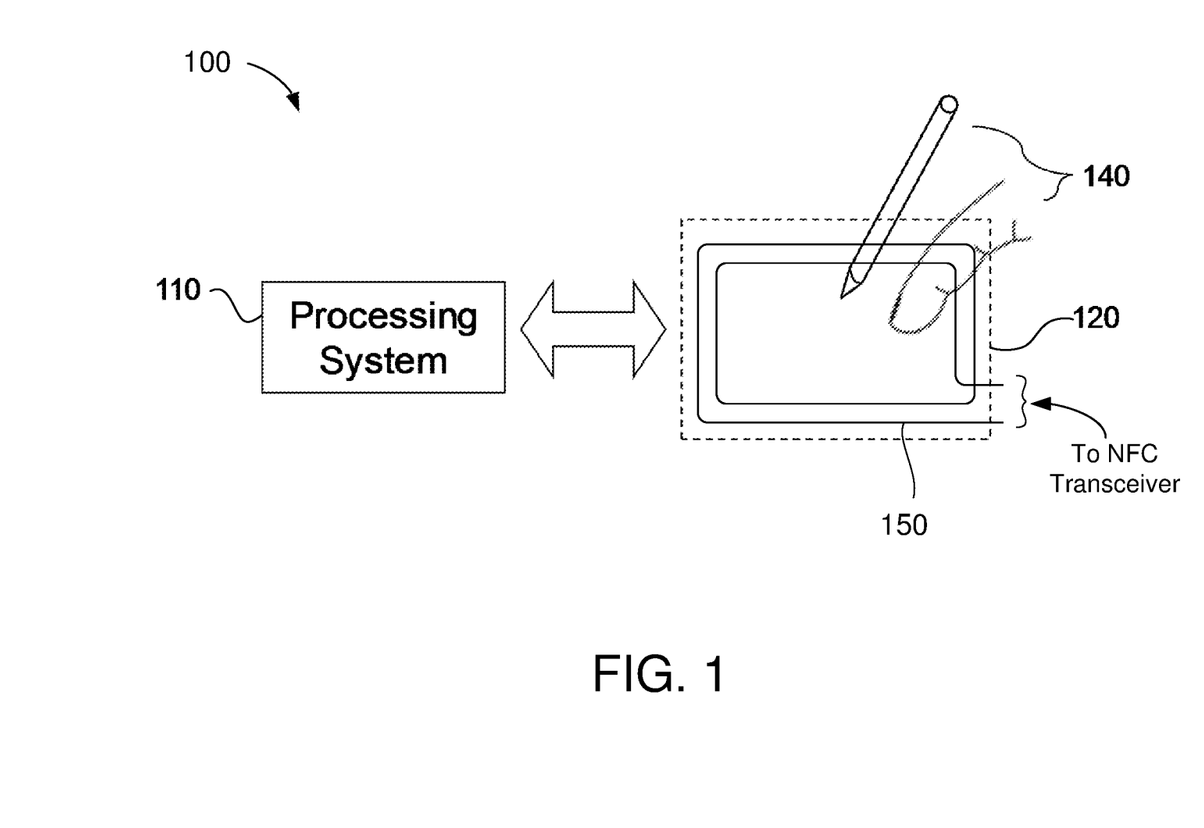
FIG. 1 shows an example input device in accordance with some implementations.

FIG. 1 shows an example input device 100 in accordance with some implementations. The input device 100 may include a processing system 110, a sensing region 120, and an antenna 150. Although the antenna 150 is shown as a loop antenna that includes two turns of a conductor within the sensing region 120, in other implementations, the antenna 150 may include any number of turns and may extend beyond the sensing region 120. The antenna 150 may be formed by a wire or other suitable metallic or semi-metallic conductor, by conductive traces disposed upon a printed circuit board or other suitable substrate or formed in any other feasible manner. In some implementations, the antenna 150 may be a patch antenna, a dipole antenna, a monopole antenna, or any other technically feasible antenna design. The antenna 150 may be coupled to a transceiver (not shown for simplicity), such as a near field communications (NFC) transceiver, to receive and transmit NFC radio-frequency (RF) communication signals. NFC communication signals may be described by ISO/IEC 14443, ISO/IEC 18092, ISO/IEC 21481 or any other technically feasible NFC standard. In other implementations, any other technically feasible transceiver may be coupled to the antenna 150, including for example, a Bluetooth® transceiver or a transceiver operating according to an IEEE 802.11 specification.

The input device 100 may be configured to provide user input to an electronic system (not shown for simplicity). Examples of electronic systems may include personal computing devices (e.g., desktop computers, laptop computers, netbook computers, tablets, web browsers, e-book readers, and personal digital assistants (PDAs)), composite input devices (e.g., physical keyboards, joysticks, and key switches), data input devices (e.g., remote controls and mice), data output devices (e.g., display screens and printers), remote terminals, kiosks, video game machines (e.g., video game consoles, portable gaming devices, and the like), communication devices (e.g., cellular phones such as smart phones), and media devices (e.g., recorders, editors, and players such as televisions, set-top boxes, music players, digital photo frames, and digital cameras).

In some aspects, the input device 100 may be implemented as a physical part of the corresponding electronic system. Alternatively, the input device 100 may be physically separated from the electronic system. The input device 100 may be coupled to (and communicate with) components of the electronic system using various wired and/or wireless interconnection and communication technologies, such as buses and networks. Example technologies may include Inter-Integrated Circuit (I²C), Serial Peripheral Interface (SPI), PS/2, Universal Serial bus (USB), Infrared Data Association (IrDA), and various RF communication protocols.

In the example of FIG. 1, the input device 100 may correspond to a proximity sensor device (e.g., also referred to as a "touchpad" or "touch sensor device") configured to sense input provided by one or more input objects 140 in the sensing region 120. Example input objects 140 include fingers, styli, and the like. The sensing region 120 may encompass any space above, around, in, and/or proximate to the input device 100 in which the input device 100 is able to detect user input (such as provided by one or more input objects 140). The size, shape, and/or location of the sensing region 120 (e.g., relative to the electronic system) may vary depending on actual implementations.

In some implementations, the sensing region 120 may detect inputs involving no physical contact with any surfaces of the input device 100, contact with an input surface (e.g., a touch surface and/or screen) of the input device 100, contact with an input surface of the input device 100 coupled with some amount of applied force or pressure, and/or any combination thereof. In some implementations, input surfaces may be provided by, and/or projected on, one or more surfaces of a housing of the input device 100 (e.g., as an image).

The input device 100 may use various sensing technologies to detect user input. Example sensing technologies may include capacitive, elastive, resistive, inductive, magnetic, acoustic, ultrasonic, and optical sensing technologies. In some implementations, the input device 100 may use capacitive sensing technologies to detect user inputs. For example, the sensing region 120 may include one or more capacitive sensing elements (e.g., sensor electrodes) to create an electric field. The input device 100 may detect inputs based on changes in capacitance of the sensor electrodes. For example, an object in contact with (or close proximity to) the electric field may cause changes in the voltage and/or current in the sensor electrodes. Such changes in voltage and/or current may be detected as "signals" indicative of user input. The sensor electrodes may be arranged in arrays or other configurations to detect inputs at multiple points within the sensing region 120. In some aspects, some sensor electrodes may be ohmically shorted together to form larger sensor electrodes. Some capacitive sensing technologies may use resistive sheets that provide a uniform layer of resistance.

Example capacitive sensing technologies may be based on "self-capacitance" (also referred to as "absolute capacitance") and/or "mutual capacitance" (also referred to as "transcapacitance"). Absolute capacitance sensing methods detect changes in the capacitive coupling between sensor electrodes and an input object. For example, an input object near the sensor electrodes may alter the electric field near the sensor electrodes, thus changing the measured capacitive coupling. In some implementations, the input device 100 may implement absolute capacitance sensing by modulating sensor electrodes with respect to a reference voltage and detecting the capacitive coupling between the sensor electrodes and input objects. The reference voltage may be substantially constant or may vary. In some aspects, the reference voltage may correspond to a ground reference voltage.

Transcapacitance sensing methods detect changes in the capacitive coupling between sensor electrodes. For example, an input object near the sensor electrodes may alter the electric field between the sensor electrodes, thus changing the measured capacitive coupling of the sensor electrodes. In some implementations, the input device 100 may implement transcapacitance sensing by detecting the capacitive coupling between one or more "transmitter" sensor electrodes and one or more "receiver" sensor electrodes. Transmitter sensor electrodes may be modulated relative to the receiver sensor electrodes. For example, the transmitter sensor electrodes may be modulated relative to a reference voltage to transmit signals, while the receiver sensor electrodes may be held at a relatively constant voltage to "receive" the transmitted signals. The signals received by the receiver sensor electrodes may be affected by environmental interference (e.g., from other electromagnetic signals and/or objects in contact with, or in close proximity to, the sensor electrodes). In some aspects, each sensor electrode may either be a dedicated transmitter or a dedicated receiver. In other aspects, each sensor electrode may be configured to transmit and receive.

The processing system 110 may be configured to operate the hardware of the input device 100 to detect input in the sensing region 120. In some implementations, the processing system 110 may control one or more sensor electrodes to detect objects in the sensing region 120. For example, the processing system 110 may be configured to transmit signals via one or more transmitter sensor electrodes and receive signals via one or more receiver sensor electrodes. In some aspects, one or more components of the processing system 110 may be co-located, for example, in close proximity to the sensing elements of the input device 100. In other aspects, one or more components of the processing system 110 may be physically separated from the sensing elements of the input device 100. For example, the input device 100 may be a peripheral coupled to a computing device, and the processing system 110 may be implemented as software executed by a central processing unit (CPU) of the computing device. In another example, the input device 100 may be physically integrated in a mobile device, and the processing system 110 may correspond, at least in part, to a CPU of the mobile device.

In some implementations, the processing system 110 may be implemented as a set of modules that are implemented in firmware, software, or a combination thereof. Example modules include hardware operation modules for operating hardware such as sensor electrodes and display screens, data processing modules for processing data such as sensor signals and positional information, and reporting modules for reporting information. In some implementations, the processing system 110 may include sensor operation modules configured to operate sensing elements to detect user input in the sensing region 120, identification modules configured to identify gestures such as mode changing gestures, and mode changing modules for changing operation modes of the input device 100 and/or electronic system.

The processing system 110 may operate the sensing elements of the input device 100 to produce electrical signals indicative of input (or lack of input) in the sensing region 120. The processing system 110 may perform any appropriate amount of processing on the electrical signals to translate or generate the information provided to the electronic system. For example, the processing system 110 may digitize analog signals received via the sensor electrodes and/or perform filtering or conditioning on the received signals. In some aspects, the processing system 110 may subtract or otherwise account for a "baseline" associated with the sensor electrodes. For example, the baseline may represent a state of the sensor electrodes when no user input is detected. Accordingly, the information provided by the processing system 110 to the electronic system may reflect a difference between the signals received from the sensor electrodes and a baseline associated with each sensor electrode.

Figure 2:
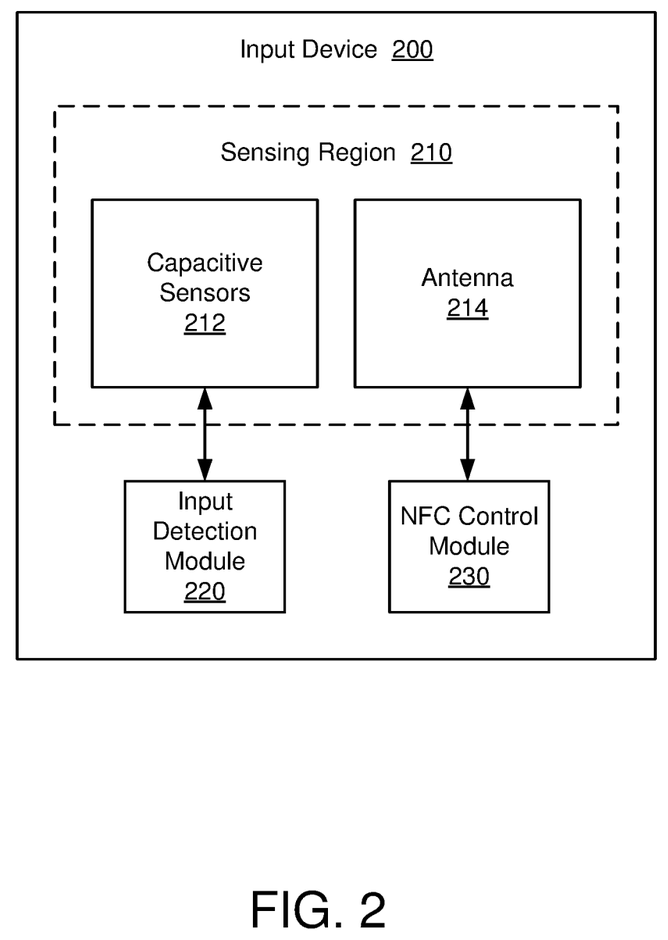
FIG. 2 is a block diagram of an input device, in accordance with some implementations.

FIG. 2 is a block diagram of an input device 200, in accordance with some implementations. The input device 200 may be an implementation of the input device 100 of FIG. 1. The input device 200 may include a sensing region 210, an input detection module 220, and an NFC control module 230. The sensing region 210, which may be an implementation of the sensing region 120 of FIG. 1, may encompass any space above, around, in, and/or proximate to the input device 200 in which the input device 200 is able to detect user input, such as provided by one or more input objects (not shown for simplicity). The size, shape, and/or location of the sensing region 210 may vary depending on actual implementations.

In some implementations, the sensing region 210 may include, or otherwise be coupled to, capacitive sensors 212 and an antenna 214. For example, the capacitive sensors 212 may include an array of sensor electrodes that create an electric field in and/or around the sensing region 210. The input device 200 may sense user inputs by detecting changes in capacitance and/or electric field through the capacitive sensors 212. In some implementations, the capacitive sensors 212 may include transmitter sensor electrodes and receiver sensor electrodes (not shown for simplicity).

The capacitive sensors 212 may be coupled to the input detection module 220. The input detection module 220, which may be implemented by, or include at least a portion of, a processing system (such as the processing system 110 of FIG. 1), controls operation of the capacitive sensors 212. For example, the input detection module 220 may operate the capacitive sensors 212 to determine a pressure and/or position associated with an input object.

The antenna 214 may be coupled to the NFC control module 230. The NFC control module 230 may be implemented by the processing system 110, or by any other processor or controller associated with an electronic system including the input device 200. In some implementations, the NFC control module 230 may be separate from the input device 200 and may be coupled to the antenna 214 by stripline, microstrip, coax, or any other technically feasible means. The NFC control module 230 may control NFC communications via an NFC transceiver (not shown for simplicity) that may be coupled to the antenna 214. Thus, the NFC control module 230 may cause the NFC transceiver to transmit and/or receive RF signals through the antenna 214. In some implementations, the functionality of the NFC transceiver may be included with the NFC control module 230.

Figure 3A:
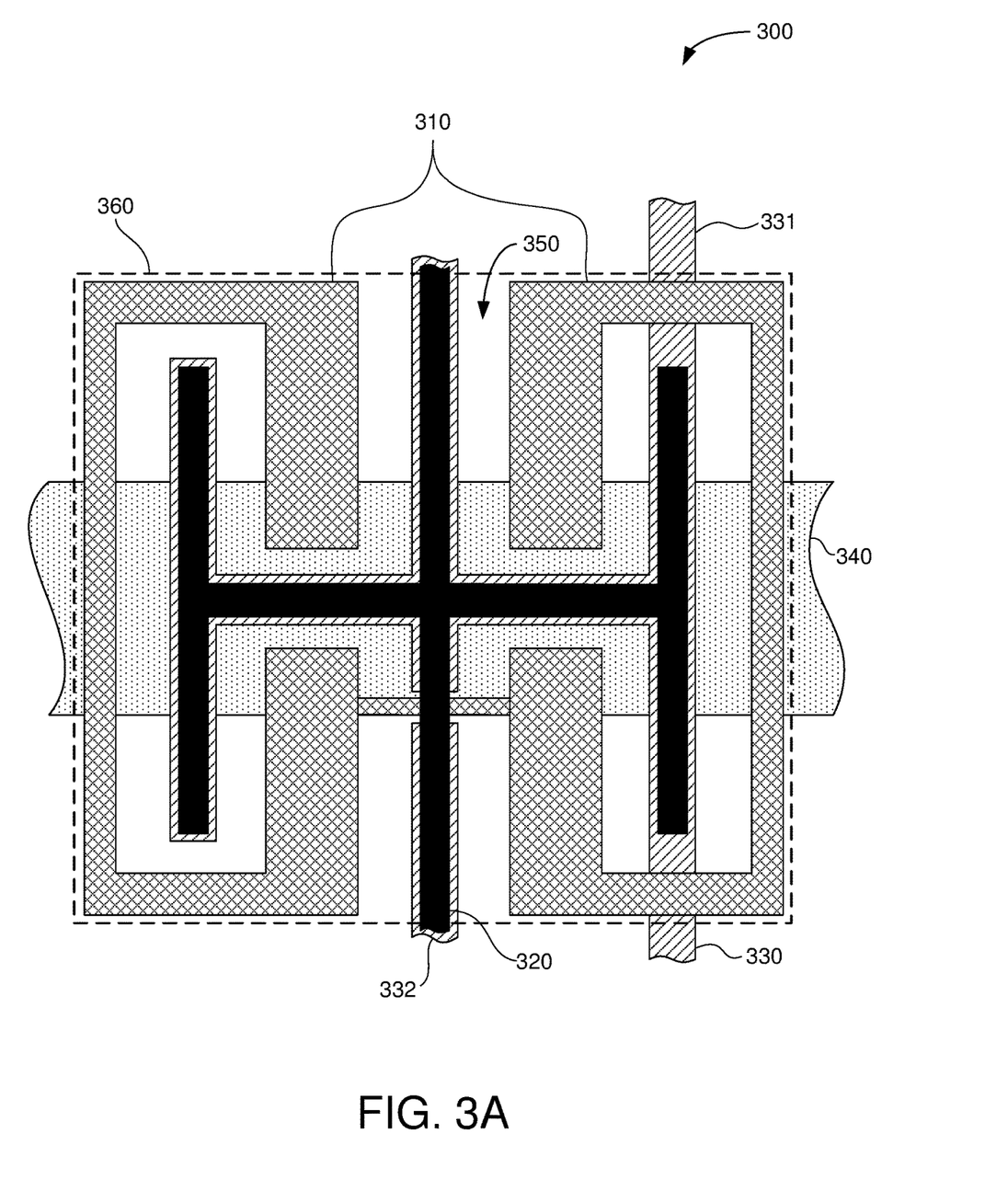
FIG. 3A shows a portion of an input device, in accordance with some implementations.

FIG. 3A shows a portion of an input device 300, in accordance with some implementations. The input device 300 may be an example implementation of the input device 100 of FIG. 1 and/or the input device 200 of FIG. 2. The input device 300 may include first sensor electrodes 310, a second sensor electrode 320, a shield trace 330, and an antenna 340. The input device 300 depicts two first sensor electrodes 310 that may be coupled together by traces, wires or other conductive means. Persons having skill in the art will appreciate that the input device 300 may include any number of first sensor electrodes 310, second sensor electrodes 320, shield traces 330, and/or antennas 340.

In the example of FIG. 3A, the two first sensor electrodes 310 are illustrated with a double cross-hatch pattern and the second sensor electrode 320 is illustrated with a solid fill pattern. The first sensor electrodes 310 and the second sensor electrode 320 may form, at least in part, the capacitive sensor array described above with respect to FIG. 2 (array not shown for simplicity). In some implementations, the first sensor electrodes 310 may be transmitter electrodes and the second sensor electrode 320 may be a receiver electrode. The transmitter electrodes may transmit modulated signals and the receiver electrode may receive the modulated signals from the transmitter electrodes. The signals received by the second sensor electrode 320 may be affected by an object, such as the input object 140 of FIG. 1 (input object 140 not shown for simplicity). Therefore, presence and/or motion of the input object 140 may be determined by an analysis of the signals received by the second sensor electrode 320. In some implementations, the analysis may be performed by the input detection module 220 of FIG. 2.

Although the first sensor electrodes 310 are shown as "C" shaped electrodes and the second sensor electrode 320 is shown as an "H" shaped electrode, persons having skill in the art will appreciate that the first sensor electrodes 310 and the second sensor electrode 320 may be implemented in any technically feasible shape. For example, in some implementations, the first sensor electrodes 310 may be implemented with horizontal traces and the second sensor electrode 320 may be implemented with vertical traces. Furthermore, the first sensor electrodes 310 may have different dimensions with respect to the second sensor electrode 320. For example, the first sensor electrodes 310 may have a wider trace width, a larger shape and/or displace more area than the second sensor electrode 320. Thus, a transmitter electrode may be wider than a receiver electrode. Alternatively, the second sensor electrode 320 may have a wider trace width, a larger shape, and/or displace more area than the first sensor electrodes 310 making the receiver electrode wider than the transmitter electrodes.

The antenna 340 (illustrated with a dot pattern) may be coupled to a transceiver (not shown for simplicity) configured to transmit and receive RF communication signals. In some implementations, the antenna 340 may be coupled to an NFC transceiver configured to transmit and receive NFC RF communication signals having a carrier frequency of 13.56 MHz. In other implementations, antenna 340 may be coupled to any technically feasible transceiver and configured to transmit and receive IEEE 802.11 signals, Bluetooth signals, or any other technically feasible RF communication signal using any technically feasible frequency.

In some implementations, the first sensor electrodes 310 and the second sensor electrode 320 may be disposed near an input surface (not shown for simplicity) of the input device 300. For example, the input surface may be a layer of the input device 300 closest to the viewer and the first sensor electrodes 310 and the second sensor electrode 320 may be disposed below (underneath) the input surface (further away from the viewer than the input surface). This arrangement may provide increased sensitivity to capacitance changes caused by any input object that is located and/or positioned at or near the input surface. The antenna 340 may be disposed below (underneath) the first sensor electrodes 310 and the second sensor electrode 320 and may be further away from the input surface than the first sensor electrodes 310 and the second sensor electrode 320.

The shield trace 330 may be disposed between (e.g., overlap) the antenna 340 and one or more sensor electrodes to reduce interference caused by RF communication signals transmitted by the antenna 340. In the example of FIG. 3A, the shield trace 330 (illustrated with a single cross-hatch pattern) is disposed between the second sensor electrode 320 and the antenna 340. Thus, if the second sensor electrode 320 is a receiver electrode (as described above), then the shield trace 330 may be disposed between the receiver electrode and the antenna 340. In other implementations, the shield trace 330 may be disposed between the first sensor electrodes 310 and the antenna 340. In still other implementations, the shield trace 330 may be disposed between both the first sensor electrodes 310 and the antenna 340 and the second sensor electrode 320 and the antenna 340. Notably, although the shield trace 330 may be configured to shield the first sensor electrodes 310 and the second sensor electrode 320, the shield trace 330 may not necessarily shield both the first sensor electrodes 310 and the second sensor electrode 320 in actual implementations. That is, simply shielding either the first sensor electrodes 310 or the second sensor electrode 320 may sufficiently reduce RF interference from the antenna 340. For example, shielding only the receiving electrode may enable input objects to be detected with relatively high sensitivity while still permitting NFC communications.

As shown, the shield trace 330 may mirror a sensor electrode to be shielded. In other words, the shield trace 330 may encompass (e.g., have a similar shape and/or dimension as) the shielded sensor electrode. Although the shape of the shield trace 330 may be similar to the shielded sensor electrode, the trace widths may be different. In some implementations, the shield trace 330 may be between 150% to 200% wider than the shielded sensor electrode. In the example of FIG. 3A, if the trace width of the second sensor electrode 320 is between 2-3 mm, then the trace width of the shield trace 330 may be between 3-6 mm. In some implementations, the shield trace 330 may be coupled to a low impedance reference voltage such as a ground reference voltage. Thus, the shield trace 330 may include one or more coupling traces 331 that may couple the shield trace 330 to the low impedance reference voltage.

Further, in some implementations, the shield trace 330 may be discontinuous. In other words, although the shield trace 330 may mirror the shape of a sensor electrode, the shield trace 330 may include multiple disjoint elements that are electrically coupled together. Returning to the example of FIG. 3A, the shield trace 330 may be electrically coupled to shield trace 332 (coupling not shown for simplicity). As shown, the shield trace 330 may be separated from the shield trace 332 by a gap. The gap may enable other traces to "cross" the path of the shield trace 330. As shown, a trace coupling two first sensor electrodes 310 is disposed within the gap between the shield trace 330 and the shield trace 332. Although not shown, the shield trace 330 and the shield trace 332 may be electrically coupled to a common low impedance reference voltage.

Although shown as isolated, the first sensor electrodes 310, the second sensor electrode 320 and the shield trace 330 may be coupled to other circuit elements that may not be shown in FIG. 3A. For example, the input device 300 may include a plurality of first sensor electrodes 310, second sensor electrodes 320 and/or shield traces 330 and 332. Each of the first sensor electrodes 310 may be coupled together. Similarly, each of the second sensor electrodes 320 may be coupled together and each of the shield traces 330 and 332 may be coupled together. In some implementations, the plurality of first sensor electrodes 310 and second sensor electrodes 320 may be arranged in an array pattern.

The area above the antenna 340 may affect transmission and reception of RF communication signals. Traces, electrodes, components and so forth that are positioned above the antenna 340 may limit (e.g., block and/or interfere with) transmitted RF signals from the antenna 340. In a similar manner, traces, electrodes, components and the like positioned above the antenna 340 may limit RF signals received by the antenna 340. For example, if an NFC transceiver is coupled to the antenna 340, then NFC communication signals may be affected by the area above the antenna 340 that is occupied by the first sensor electrodes 310, the second sensor electrode 320, and/or the shield trace 330. Reducing the area of the first sensor electrodes 310 and the second sensor electrode 320 may increase performance of the NFC transceiver, but may decrease the sensitivity of an associated capacitive sensor array. On the other hand, increasing the area of the first sensor electrodes 310 and the second sensor electrode 320 may decrease performance of the NFC transceiver but may increase the sensitivity of the associated capacitive sensor array.

Thus, it may be desirable to strike a balance between the sensitivity of the capacitive sensor array and the sensitivity of the transceiver coupled to the antenna 340. In some embodiments, an "open area ratio" between 40% and 50% may be maintained in the region above and/or near the antenna 340. The open area ratio may be defined as an open area (e.g., an area devoid of traces, electrodes, components, and so forth) divided by the total area of a region. In the example of FIG. 3A, the open area ratio associated with a region 360 (illustrated by a box bounded by dashed lines) may be the area of open area 350 divided by the area of the region 360. An open area ratio of between 40% and 50% (e.g., a ratio greater than or equal to 40% and less than or equal to 50%) may provide a sufficiently open area for the antenna 340 to transmit and receive RF signals with little interference while also providing sufficient sensor area for the first sensor electrodes 310 and the second sensor electrode 320 to effectively sense input objects. Although the shield trace 330 and shield trace 332 may reduce the open area ratio, the shielding effect provided by the shield traces 330 and 332 may enable the first sensor electrodes 310 and the second sensor electrode 320 to sense input objects while being located near the antenna 340.

Figure 3B:
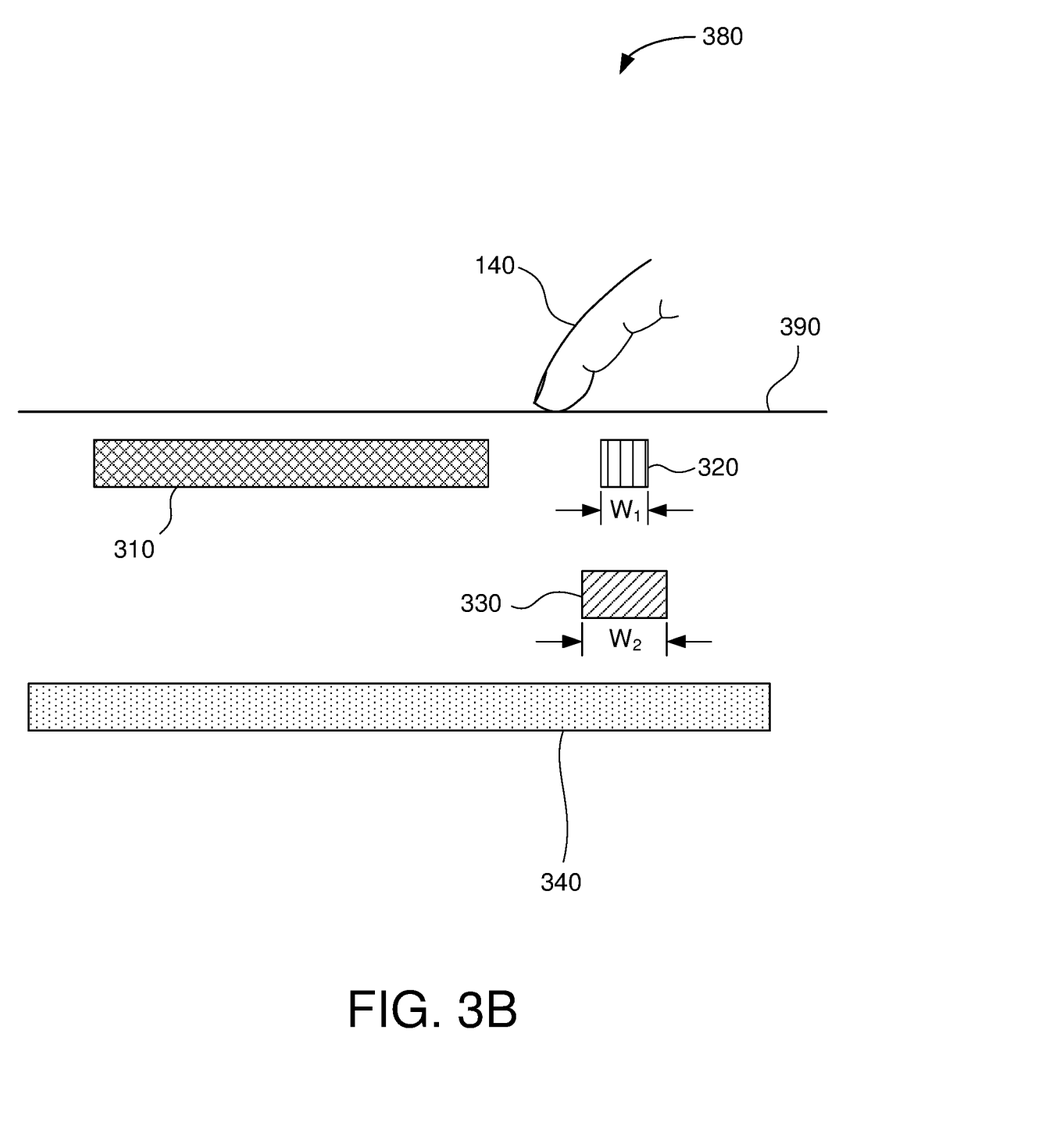
FIG. 3B shows a side view of the portion of the input device of FIG. 3A

FIG. 3B shows a side view 380 of the portion of the input device 300 of FIG. 3A. The side view 380 includes the first sensor electrodes 310, the second sensor electrode 320, the shield trace 330, and the antenna 340 of FIG. 3A. The side view 380 illustrates a possible vertical stack up of the elements of the input device 300. For reference, the side view 380 shows an input surface 390. As described above, the input surface 390 may be a surface of the input device 300. In some implementations, a first side of the input surface 390 may provide a contact surface for an input object such as the input object 140 of FIG. 1 (finger shown for reference only). The first sensor electrodes 310 and the second sensor electrode 320 may be disposed below the input surface 390 (e.g., below a second side of the input surface 390). As described above with respect to FIG. 3A, the first sensor electrodes 310 may be a transmitting sensor electrode and the second sensor electrode 320 may be a receiving sensor element of a capacitive sensor array.

The antenna 340 may be disposed below (e.g., beneath) the first sensor electrodes 310 and the second sensor electrode 320. The shield trace 330 may be disposed between the second sensor electrode 320 and the antenna 340. Thus, the shield trace 330 may shield the second sensor electrode 320 from RF signals from the antenna 340. The width of the shield trace 330 may be wider than the width of the second sensor electrode 320. In some implementations, the width of the shield trace 330 may be between 150%-200% the width of the second sensor electrode 320 (e.g., the shield width may be greater than or equal to 150% to less than or equal to 200% of the trace width of the shielded trace).

Figure 4:
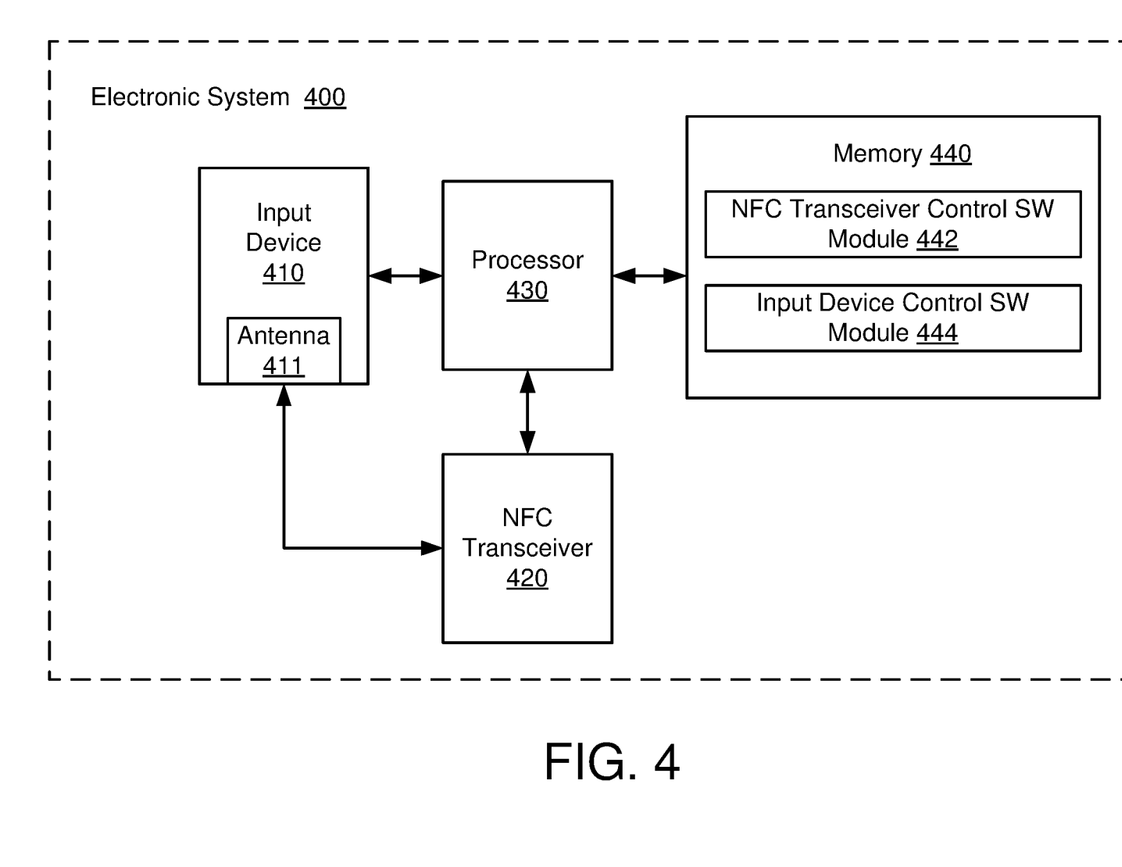
FIG. 4 is a block diagram of an example electronic system 400.

FIG. 4 is a block diagram of an example electronic system 400. The electronic system 400 may include an input device 410, an NFC transceiver 420, a processor 430, and a memory 440. The input device 410 may be an implementation of the input device 100 of FIG. 1, the input device 200 of FIG. 2, or the input device 300 of FIG. 3A. The input device 410 may include an antenna 411 which may be coupled to the NFC transceiver 420. The NFC transceiver 420 may transmit and receive NFC communication signals through the antenna 411.

The input device 410 may include one or more sensor electrodes such as the first sensor electrodes 310 and the second sensor electrode 320 described above with respect to FIGS. 3A-3B. In some implementations, the one or more sensor electrodes may include transmitter sensor electrodes and receiver sensor electrodes as described above with respect to FIGS. 1, 2, 3A, and 3B. Furthermore, one or more sensor electrodes may form a capacitive sensing array (not shown for simplicity). The input device 410 may be coupled to, and at least partially controlled by the processor 430. In some implementations, the processor 430 may provide the functionality of the processing system 110 described above with respect to FIG. 1. The NFC transceiver 420 may be coupled to the processor 430. The processor 430 may provide data to and receive data from the NFC transceiver 420. The NFC transceiver 420 may transmit and receive the data using NFC communication signals.

The memory 440 may include a non-transitory computer-readable storage medium (such as one or more nonvolatile memory elements, such as EPROM, EEPROM, Flash memory, a hard drive, and so on) that may store the following software modules:

an NFC transceiver control software (SW) module 442 to control operations of the NFC transceiver 420; and an input device control SW module 444 to control operations of the input device 410.

The processor 430, which may be coupled to the input device 410, the NFC transceiver 420, and the memory 440, may be any one or more suitable controllers, processors, state machines or the like capable of executing scripts or instructions of one or more software programs stored in the electronic system 400 (e.g., within the memory 440). In some embodiments, the processor 430 may be implemented with a hardware controller, a processor, a state machine, or other circuits to provide the functionality of the processor 430 executing instructions stored in the memory 440.

The processor 430 may execute the NFC transceiver control SW module 442 to initiate, transmit, and receive NFC communications through the antenna 411.

The processor 430 may execute the input device control SW module 444 to detect the presence and/or motion associated with an input object through the input device 410. In some implementations, the processor 430 may execute the input device control SW module 444 to transmit signals through the transmitter sensor electrodes, receive signals through the receiver sensor electrodes, and analyze the received signals to determine presence and/or motion information associated with the input object.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. An input device comprising:
an input surface having a sensing region;
a plurality of sensor electrodes disposed beneath the input surface and configured to detect an input object in the sensing region, wherein the plurality of sensor electrodes includes at least a first electrode and a second electrode;
an antenna disposed beneath the input surface and the plurality of sensor electrodes, the antenna being configured to transmit and receive radio-frequency (RF) communication signals; and
a shield trace disposed between the plurality of sensor electrodes and the antenna, wherein the shield trace encompasses a first region in which the first electrode overlaps the antenna and is absent from a second region, different than the first region, in which the second electrode overlaps the antenna.

2. The input device of claim 1, wherein the shield trace encompasses the first electrode.

3. The input device of claim 1, wherein the first electrode is a receiver sensor electrode and the second electrode is a transmitter sensor electrode.

4. The input device of claim 1, wherein the shield trace is wider than the first electrode.

5. The input device of claim 1, wherein a width of the shield trace is less than or equal to 200 percent of a width of the first electrode.

6. The input device of claim 1, wherein a width of the shield trace is greater than or equal to 150 percent of a width of the first electrode.

7. The input device of claim 1, wherein the plurality of sensor electrodes is configured to detect the input object based on a capacitive coupling between the first electrode and the second electrode.

8. The input device of claim 1, wherein an open area ratio associated with an area occupied by the plurality of sensor electrodes and the shield trace is greater than or equal to 40 percent.

9. The input device of claim 1, wherein an open area ratio associated with an area occupied by the plurality of sensor electrodes and the shield trace is less than or equal to 50 percent.

10. The input device of claim 1, wherein the second electrode has a wider trace width than the first electrode.

11. The input device of claim 1, wherein the shield trace is coupled to a low impedance reference voltage.

12. The input device of claim 1, wherein the antenna is configured to transmit and receive near field communication (NFC) signals.

13. An electronic system comprising:
- a transceiver configured to transmit and receive radio-frequency (RF) communication signals; and
- an input device comprising:
  - an input surface having a sensing region;
  - a plurality of sensor electrodes disposed beneath the input surface and configured to detect an input object in the sensing region, wherein the plurality of sensor electrodes includes at least a first electrode and a second electrode;
  - an antenna disposed beneath the input surface and the plurality of sensor electrodes, the antenna being configured to transmit RF communication signals from the transceiver; and
  - a shield trace disposed between the plurality of sensor electrodes and the antenna, wherein the shield trace encompasses a first region in which the first electrode overlaps the antenna and is absent from a second region different than the first region, in which the second electrode overlaps the antenna.

14. The electronic system of claim 13, wherein the shield trace encompasses the first electrode.

15. The electronic system of claim 13, wherein the first electrode is a receiver sensor electrode and the second electrode is a transmitter sensor electrode.

16. The electronic system of claim 13, wherein the shield trace is wider than the first electrode.

17. The electronic system of claim 13, wherein the plurality of sensor electrodes is configured to detect the input object based on a capacitive coupling between the first electrode and the second electrode.

18. The electronic system of claim 13, wherein the second electrode has a wider trace width than the first electrode.

19. The electronic system of claim 13, wherein the shield trace is coupled to a low impedance reference voltage.

20. The electronic system of claim 13, wherein the antenna is configured to transmit and receive near field communication (NFC) signals.

* * * * *